B. S. JORDAN.
OVERHEAD TRACK.
APPLICATION FILED OCT. 23, 1919.
1,328,523. Patented Jan. 20, 1920.
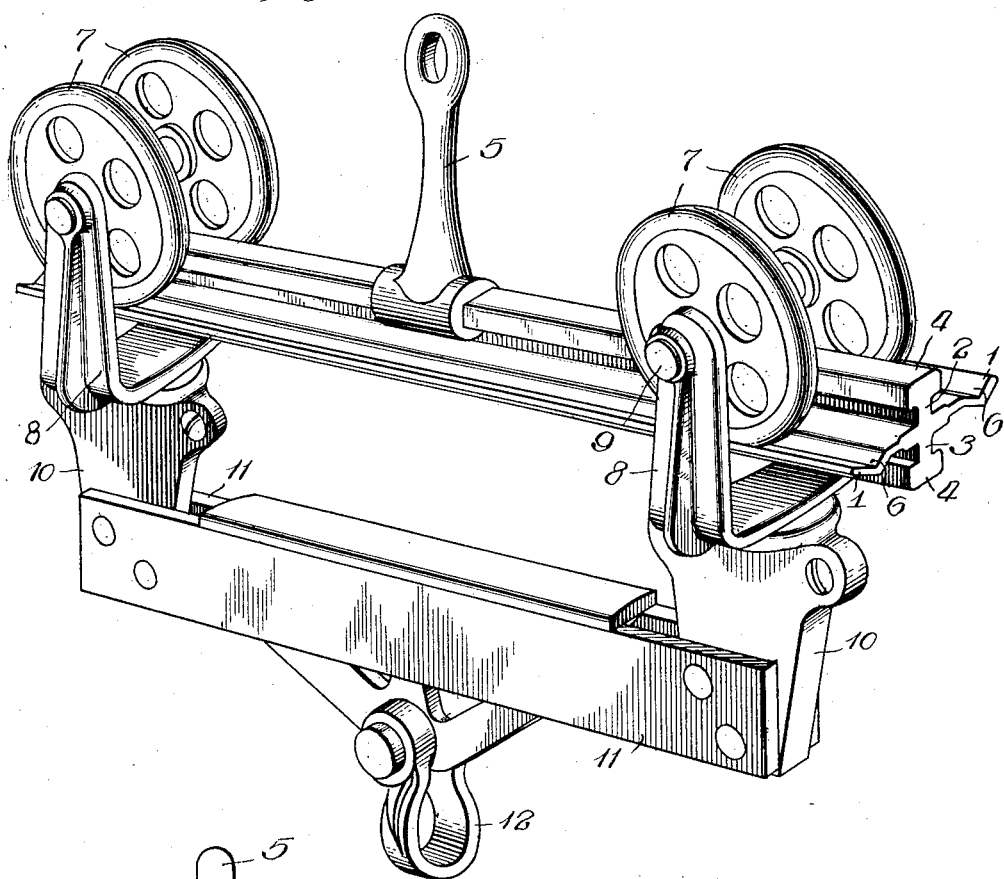
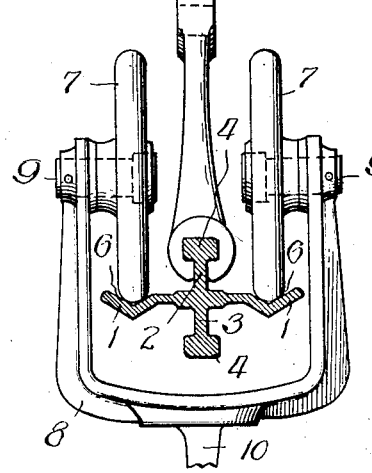
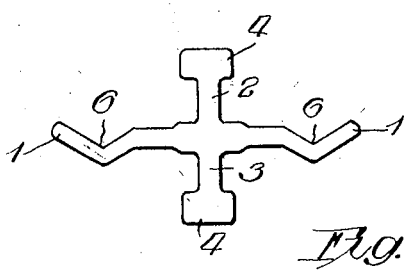
Inventor
Burton S. Jordan
By: [signature] Atty.

UNITED STATES PATENT OFFICE.

BURTON S. JORDAN, OF OTTAWA, ILLINOIS, ASSIGNOR TO J. E. PORTER COMPANY, OF OTTAWA, ILLINOIS, A CORPORATION OF ILLINOIS.

OVERHEAD TRACK.

1,328,523.   Specification of Letters Patent.   Patented Jan. 20, 1920.

Application filed October 23, 1919. Serial No. 332,598.

*To all whom it may concern:*

Be it known that I, BURTON S. JORDAN, a citizen of the United States, residing at Ottawa, in the county of La Salle and State of Illinois, have invented new and useful Improvements in Overhead Tracks, of which the following is a specification.

This invention relates to overhead tracks and wheels therefor, and has for its object to provide the tread portion of the track and the wheels bearing thereon with coacting means for holding the wheels from lateral displacement on the tread portion in either direction, and thus avoid the use of wheels having flanges engaging over the edges of the tread portion of the track.

In the accompanying drawings—

Figure 1 is a perspective view of a track member and carrier supported thereby, with the tread portions of the track member and wheels of the carrier having coacting means embodying the features of my invention;

Fig. 2 is a transverse sectional view through the track member and showing the wheels thereon; and Fig. 3 is an end view of said track member with the wheels omitted.

In the drawings, I have shown a track member made substantially cross-shaped and of metal and having the side flanges 1, 1 on opposite sides of and extending horizontally outward from a mid flange having an upper portion 2 projecting above the side flanges and a lower portion 3 projecting below the same. The side flanges 1, 1 constitute the tread portions of the track member, and each mid portion 2, 3 has an enlarged head 4 extending along the longitudinal edge thereof, the upper one being engaged by a bracket 5 for suspending the track member from an overhead support. The lower head 4 is engaged by a coupling (not shown) for connecting two track sections together at their abutting ends.

Each side flange 1, 1 is provided in its upper surface with an upwardly opening, substantially V-shaped groove 6 extending the full length of the flange and arranged between its outer edge and the upright mid portion 2, the wheels 7, 7 of the carrier or other device supported by said track member having rolling contact with the side flanges 1, 1 in the grooves 6, 6 thereof. As shown in the drawings, there are four wheels for the type of carrier illustrated, and said wheels are arranged in pairs with the wheels of each pair oppositely disposed or laterally spaced apart, with one wheel in the groove 6 of one side flange 1 and the other wheel in the groove 6 of the opposite side flange. Each pair of wheels 7 is connected by a truck 8 straddling the track member 3 from beneath, and the wheels for each truck are journaled on studs 9 secured to the upright arms of the truck, so that the wheels are not connected together above the track member in order to permit the wheels to pass the bracket 5 as the same are rolled on the track. The trucks 8 have depending swiveled portions 10 connected together beneath the track member by frame plates 11, from which depends a loop 12 to permit a load or article to be engaged with and carried by the carrier.

Each wheel 7 is vertically arranged and has rolling contact with its side flange 1 in the groove 6 thereof, and as the side surfaces of the groove are inclined upward and outward from the bottom of the groove, it follows that the tread surface of the wheel contacts with said inclined surfaces below the upper end of the groove, thereby holding the wheel from leaving the groove sidewise and thus preventing the wheel from lateral displacement on the side flange 1 in either direction. Each wheel 7, as shown, has its tread portion rounded or made convex in form, so that the wheel has contact with each inclined surface of the groove at only one point and that being above the bottom of the groove but below the upper end thereof. By the construction described and shown, the tread portions of the track member and the wheels bearing thereon have coacting means for holding the wheel from lateral displacement on the track member in either direction, and, further, the wheel has rolling contact with the tread portion of the track member inside of the outer edge thereof, thus avoiding the use of wheels having a side flange or rim to engage over one of the edges of the track member.

I claim as my invention:

1. In combination with a plurality of oppositely disposed wheels connected together, a track member for supporting said wheels and having a substantially flat, horizontally arranged flange for each wheel, the latter and the flange therefor having coacting means inside of the outer edge of said flange for holding the wheel from lateral displacement on said flange in either direction.

2. In combination with a plurality of oppositely disposed wheels connected together, a track member for supporting said wheels and having an upright web and a substantially flat, horizontally arranged flange on each side thereof, each wheel and flange therefor having coacting means inside of the outer edge of said flange for holding the wheel from lateral displacement on said flange in either direction.

3. In combination with a plurality of oppositely disposed wheels connected together, a track member for supporting said wheels and having a tread portion for each wheel, each tread portion provided with a substantially V-shaped groove extending longitudinally thereof to receive one of the wheels.

4. In combination with a plurality of oppositely disposed wheels connected together, a track member for said wheels and having a mid web and a track portion on opposite sides thereof, each wheel and the flange therefor having coacting means inside of the outer edge of said flange for holding the the wheel from lateral displacement on said flange in either direction.

5. In combination with a plurality of oppositely disposed wheels connected together, a track member for said wheels and having a mid portion and a tread portion on opposite sides thereof, each tread portion provided with a substantially V-shaped groove extending longitudinally thereof to receive one of said wheels.

6. A track member, comprising an upright mid web, a substantially flat, horizontally arranged flange on each side thereof, and each flange being provided with an upwardly opening, substantially V-shaped groove extending longitudinally thereof.

In testimony that I claim the foregoing as my invention, I affix my signature, this 20th day of October, A. D. 1919.

BURTON S. JORDAN.